United States Patent [19]
Schiff

[11] 3,934,203
[45] Jan. 20, 1976

[54] SPREAD SPECTRUM MODEM

[75] Inventor: Maurice Leon Schiff, Fort Wayne, Ind.

[73] Assignee: The United States of America as represented by the Secretary of the Navy, Washington, D.C.

[22] Filed: May 24, 1974

[21] Appl. No.: 473,120

[52] U.S. Cl. ................................................. 325/65
[51] Int. Cl.² ....................................... H04B 15/00
[58] Field of Search ............................... 325/42, 68

[56] References Cited
UNITED STATES PATENTS
3,706,933  12/1972  Bidell et al. ............................ 325/42

Primary Examiner—George H. Libman
Attorney, Agent, or Firm—R. S. Sciascia; G. J. Rubens; H. Fendelman

[57] ABSTRACT

Digital data having a rate R and to be transmitted is converted into a K-bit code, T-seconds long and delayed according to a particular N-bit word, where $N=RT$, whereby the code carries information in its delayed position in the T frame and not in the code itself. At a receiver station, the correlation function of the received signal is produced and the envelope detected, after which the samples are taken at each of the K possible output times. The largest output selected comprises the information on the delay of the transmitted signal.

1 Claim, 1 Drawing Figure

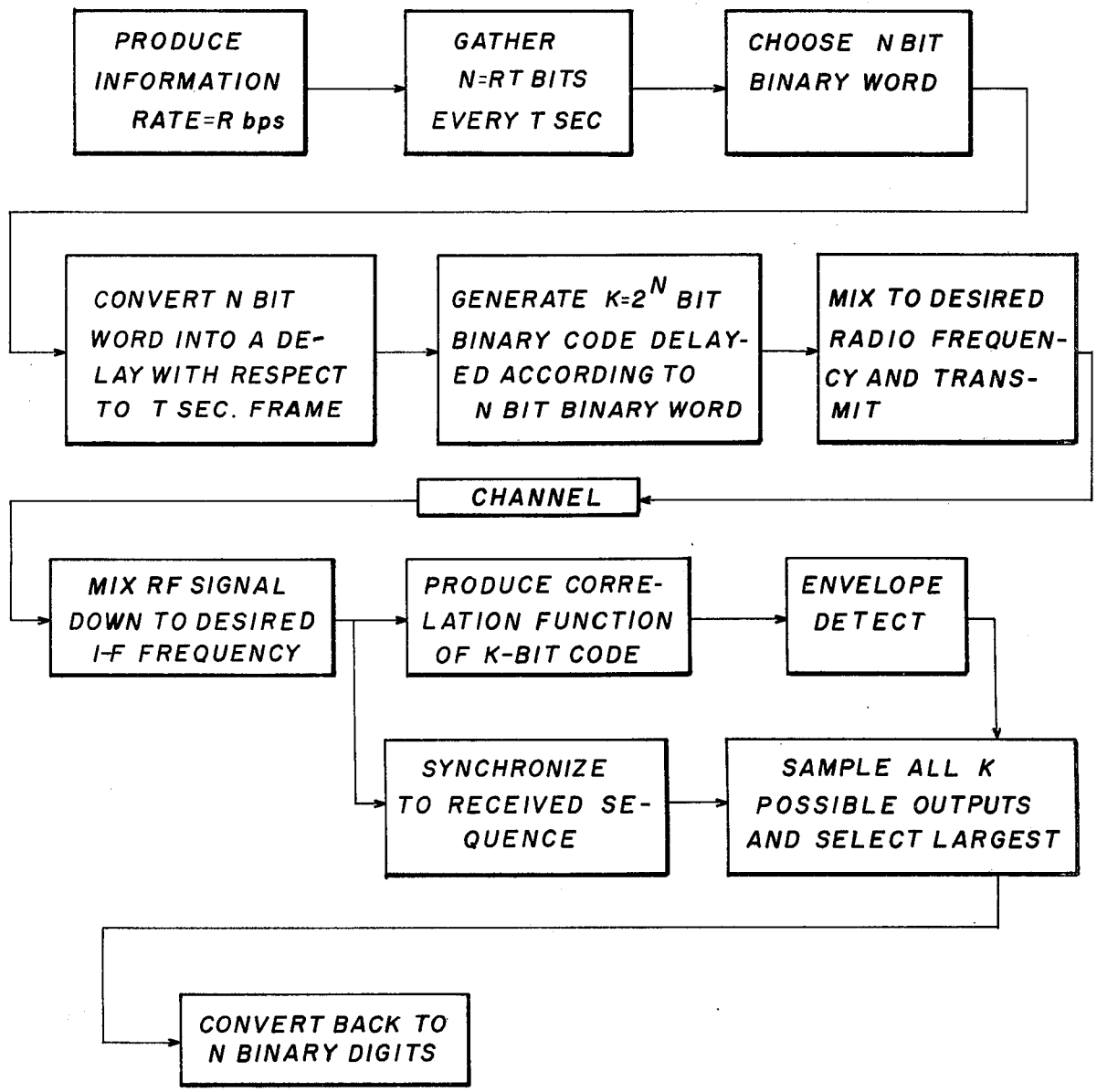

SPREAD SPECTRUM MODEM

BACKGROUND OF THE INVENTION

Spread spectrum concepts are gaining increasing importance in the protection of communication links from jamming and detection by unfriendly forces. The most common prior art technique comprises a direct modulation of pseudorandom sequences. A binary code is generated at an information rate which is much greater than that of the data being transmitted. The data is modulo-two added to the binary code, and the resultant sequence is modulated on a suitable carrier frequency, and then it is transmitted. At the receiver, the signal is heterodyned down to baseband to remove the high frequency carrier. A high rate binary sequence which is identical to the transmitter sequence is synchronized to the incoming sequence and modulo-two added to thereby reproduce the lower rate data information back into its original form.

The above technique has several disadvantages. First, in the heterodyne procedure, a local oscillator signal of proper frequency is mixed with the incoming signal. To obtain the proper signal at baseband, the phase of the local oscillator must be identical to that of the received signal, thereby necessitating the use of elaborate techniques such as phased lock loops and in-phase and quadrature channels. Second, assuming that the signal has been properly heterodyned, to recover the data, the high-rate digital sequence generated at the receiver must be precisely synchronized with the corresponding sequence in the received waveform. As is known to those skilled in the art, achieving the requisite synchronization is a complex problem.

SUMMARY OF THE INVENTION

A spread spectrum modem especially useful in protecting communication links from jamming and detection by hostile forces is disclosed. Digital information at a rate of R bits per second, and which is to be transmitted, is formed into N-bit words each T-seconds, where $N=RT$. The time interval T is divided into $K=2^N$ units of time and after a decision is made as to which K words are present in the N-bit words, a K-bit binary code is generated. The code is T-seconds long and is delayed according to the particular N-bit word, whereby the code carries information by means of its delayed position in the T frame and not in the code itself. At the receiver, the received signal is heterodyned down to a lower IF frequency and then processed to produce the correlation function which is envelope detected and sampled at each of the K possible output times. The largest output represents the information transmitted on the delay of the signal.

OBJECTS OF THE INVENTION

It is the primary object of the present invention to provide a spread spectrum modem to protect communication links from jamming and detection by unfriendly forces.

It is another object to provide a spread spectrum modem in which the system is synchronized without the need for any transmitted reference.

It is a further object to provide a spread spectrum modem in which the phase or coherence problem of existing systems is eliminated by transmitting information by pulse position and not in relative phase.

Other objects, advantages and novel features of the invention will become apparent from the following detailed description of the invention when considered in conjunction with the accompanying drawings.

BRIEF DESCRIPTION OF THE DRAWINGS

The FIGURE is a simplified block diagram of the novel spread spectrum method to be disclosed herein.

DESCRIPTION OF THE PREFERRED EMBODIMENT

The FIGURE illustrates in simplified form, a method comprising the inventive concept to be disclosed herein for a spread spectrum modem. Briefly, the method disclosed in the FIGURE comprises the following steps.

At the transmitter station digital information to be transmitted is produced at a rate equal to R bits per second. Every T-seconds, $N=RT$ bits of information are gathered by a shift register, for example. An N-bit word is then selected. The time interval T is next divided by $K=2^N$, so that each unit of time, X, equals T/K ($X=T/K$).

Each N-bit word is then converted into a delay with respect to the T-second frame, and after a decision is made as to which of the K words from among the N-bit words is present, a K-bit binary code is generated. The code is T-seconds long and is delayed according to the particular N-bit word.

For example if $N=3$, then $K = 8$, and $X=T/8$. The logic word 000 would thus produce no delay; 010 would produce a delay of 2; and, 111 would produce a delay of 7, etc. As can be seen, the K-bit code carries information by means of its delayed position in the T-second frame and not in the code itself.

The resultant K-bit code is then modulated on any desired carrier radio frequency and the mixed signal is transmitted via an RF link, for example.

At the receiver station, the signal is heterodyned down to any lower IF frequency. At the IF frequency the usual correlation function of the signal is produced by a matched filter which is set to the K-bit code. If a reference can be established, the sharpest correlation peak will follow the delayed information of the code.

For example if the code is transmitted early in the T-second frame, then the received correlation will occur early in the frame, since essentially, the correlation peak occurs at random among the K possible outputs so that the average or expected position is in the middle and has the same average value as the T-second frame rate, i.e., the correlation peak can occur only at K discrete intervals separated by X seconds. This fact is used to synchronize the system without the need for a transmitted reference. Furthermore, the phase or coherence problem is eliminated because the information is carried by pulse position and not in relative phase as in the prior art.

The correlation function is next envelope detected and samples are taken at each of the K possible output times. The largest of the sampled outputs is selected, and it comprises the information on the delay of the transmitted signal. Finally, the delay information is reconverted back into the corresponding set of N binary bits.

Thus, regardless of the phase, the incoming code will correlate through the matched filter. The effect of the unknown phase will be to shift the correlation peak by a very small amount, which in most cases is less than one-half cycle of the operating frequency of the correlator. This allows envelope detection of the peak with retention of all information. Furthermore using the synchronizing technique described, one can sample all possible times when the output can occur, whereby the largest output can be selected and converted back into a digital sequence.

Obviously many modifications and variations of the present invention are possible in the light of the above teachings. It is therefore to be understood that within the scope of the appended claims the invention may be practiced otherwise than as specifically described.

What is claimed is:

1. A method for transmitting and receiving digital data in spread spectrum communication systems and comprising the steps of:

at a transmitting station, producing digital information at a rate R-bits/second;

forming said information into N-bit words each T-seconds, where $N=RT$;

dividing said T-seconds into $K=2^N$ units;

converting said N-bit words into a delay with respect to said T-seconds;

generating a K-bit binary code in response to each of said N-bit words and delayed according to the particular N-bit word;

mixing said code to a selectively predetermined radio frequency and transmitting the resulting signal;

at a receiving station, heterodyning said signal down to a selectively predetermined IF frequency;

producing the correlation function of the K-bit code after it is heterodyned;

envelope detecting said correlation function;

sampling all K possible outputs and selecting the largest of said outputs; and, converting the selected output back to said N-bit word.

* * * * *